United States Patent [19]

Takahashi

[11] 4,362,487

[45] Dec. 7, 1982

[54] APPARATUS FOR MANUFACTURING SLIDE FASTENER CHAINS HAVING SOLID SECTIONS

[75] Inventor: Kihei Takahashi, Uozu, Japan

[73] Assignee: Yoshida Kogyo K.K., Tokyo, Japan

[21] Appl. No.: 292,529

[22] Filed: Aug. 13, 1981

[30] Foreign Application Priority Data

Aug. 30, 1980 [JP] Japan .................................. 55-120332
Aug. 30, 1980 [JP] Japan .................................. 55-120333

[51] Int. Cl.³ ............................ B29D 5/00; B29F 1/00
[52] U.S. Cl. ..................................... 425/111; 425/121; 425/122; 425/126 R; 425/129 R; 264/273
[58] Field of Search ................... 425/121, 122, 126 R, 425/129 R, 814, 111; 264/273

[56] References Cited

U.S. PATENT DOCUMENTS

| 3,672,805 | 6/1972 | Porepp | 425/814 X |
|---|---|---|---|
| 3,849,042 | 11/1974 | Anderegg | 425/126 R |
| 3,897,192 | 7/1975 | Heimberger et al. | 425/814 X |
| 4,226,577 | 10/1980 | Sawada | 425/111 |
| 4,251,912 | 2/1981 | Yoshida | 425/814 X |
| 4,257,839 | 3/1981 | Yoshida et al. | 425/814 X |
| 4,304,748 | 12/1981 | Takahashi | 425/814 X |

Primary Examiner—J. Howard Flint, Jr.
Attorney, Agent, or Firm—Hill, Van Santen, Steadman, Chiara & Simpson

[57] ABSTRACT

An apparatus for manufacturing a fastener chain having solid sections by repeating the steps of providing a tape having perforated sections which include holes punched in a longitudinal edge of the tape, and solid sections, which are free of holes, alternating with the perforated sections, supplying the tape so that the perforated section thereof is placed between a stationary mold and movable mold, applying tension to the tape to stretch it, and then injection-molding fastener elements onto the tape at the holes. Stretching of the tape is accomplished by a sprocket wheel provided adjacent a freely rotatable drum. Teeth on the circumferential surface of the sprocket wheel are caused to recede below the circumferential surface of the freely rotatable drum when a solid section of the tape passes over the drum.

3 Claims, 13 Drawing Figures

APPARATUS FOR MANUFACTURING SLIDE FASTENER CHAINS HAVING SOLID SECTIONS

BACKGROUND OF THE INVENTION

1. Field of the Invention

This invention relates to an apparatus for continuously manufacturing a slide fastener chain, in which lengths of a fastener tape (referred to merely as a tape hereafter) are introduced into a synthetic resin injection molding machine. The tape in this case has perforated sections of predetermined length consisting of holes provided beforehand along a longitudinal edge of the tape, the holes serving to secure fastener elements to be subsequently injection-molded therein, and solid sections where no holes have been provided. The injection molding machine includes molds provided with rows of fastener element molding cavities that agree with the holes in the perforated sections of the tape. To continuously manufacture the slide fastener chain, the apparatus of the invention repeats the steps of introducing a perforated section of the tape into the molds of the molding machine, injection molding and securing fastener elements onto the tape at each of the holes in said perforated section, and then feeding the next perforated section of the tape into the molds, the last mentioned perforated section being separated from the earlier perforated section by the interval of a solid section. More particularly, the present invention concerns a fastener chain manufacturing apparatus with an improved tape feed device having a tensioning mechanism for stretching the tape. Specifically, the holes in the perforated sections of predetermined length are spaced at regular intervals which are smaller than the intervals at which the fastener element molding cavities in the molds are spaced. When the molds are half-closed just prior to the injection molding step, the tensioning mechanism tensions the tape to stretch it by a predetermined amount, whereby the spacing intervals and positions of the holes in the tape are brought into agreement with the spacing intervals and positions of the fastener element molding cavities in the molds.

2. Description of the Prior Art

The inventor has already invented an apparatus for manufacturing a continuous length of slide fastener chain and has filed an application on such invention under the date of Oct. 1, 1979 (Japanese Patent Public Disclosure No. 51326/81, corresponding to U.S. Ser. No. 190,979, now Pat. No. 4,336,220). The apparatus introduces a tape, provided in advance with a continuous row of holes along a longitudinal edge thereof, but without solid sections devoid of the holes, into a synthetic resin injection molding machine for molding the fastener elements, tensions the tape to stretch it, and when the molds are half-closed, in such a manner that the spacing intervals and positions of the holes in the tape are brought into agreement with the spacing intervals and positions of the fastener element molding cavities, then closes the molds to injection-mold and secure fastener elements onto the tape at the holes. These steps are repeated to manufacture the fastener chain. The earlier invention, however, provides a length of slide fastener chain in which the fastener elements are molded and secured onto the tape in a continuous row, and cannot be applied, as such, to the manufacture of a fixed length of slide fasteners provided with alternating sections having attached fastener elements, and blank sections devoid of fastener elements.

SUMMARY OF THE INVENTION

In order to continuously manufacture a fastener chain for slide fasteners of a fixed length, namely a fastener chain having solid intervals, it is required to make use of a manufacturing apparatus equipped with fastener element molds, a tape guide mechanism and a tension mechanism designed expressly for this purpose. The object of the present invention is to provide a manufacturing apparatus which satisfies the abovementioned requirement.

In accordance with a feature of the novel apparatus, there are provided, in combination, a freely rotatable drum for guiding a tape, and a sprocket wheel having a multiplicity of teeth on its circumferential surface for penetrating the holes in a length of tape that includes both solid sections and perforated sections which alternate longitudinally of the tape. When a solid section of the tape comes into contact with the circumferential surface of the freely rotatable drum, the rotary shaft of the sprocket wheel is moved with respect to the shaft of the freely rotatable drum, causing the tips of the teeth on the sprocket wheel to sink below the circumferential tape-contact surface of the drum. When a perforated section of the tape comes into contact with the freely rotatable drum, the rotary shaft of the sprocket wheel is moved with respect to the shaft of the freely rotatable drum in the direction opposite to that in the former case, causing the teeth on the sprocket wheel to be projected beyond the circumferential tape-contact surface of the drum, thereby to penetrate and to mesh with the holes in the tape. Thus, the sprocket wheel and freely rotatable drum cooperate to assure retention and transfer of the tape. Two sprocket wheel and drum combinations are provided, one disposed above the other, the rotary shafts of the upper and lower sprocket wheels being operatively coupled through an intermediate gear. The shaft of the intermediate gear is connected to a reverse drive tensioning mechanism which stretches the tape when the molds of the fastener element injection molding machine are half closed.

Other objects, advantages and features of the invention will be apparent from the following description of the preferred embodiment taken in conjunction with the accompanying drawings.

DETAILED DESCRIPTION OF THE PREFERRED EMBODIMENT

Figure 1:
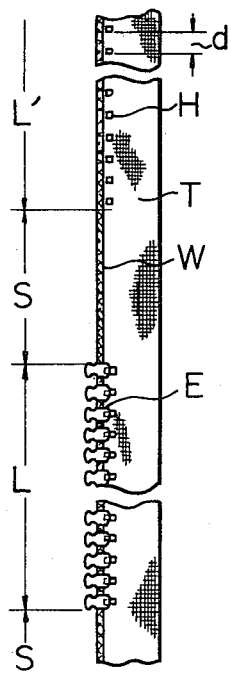
FIG. 1 is a front view showing a portion of a tape supplied to the apparatus of the present invention, the tape including a section having previously injection-molded fastener elements secured thereto.

FIG. 1 is a front view, partially cutaway, showing a slide fastener stringer tape T which includes a perforated section L having punched holes H punched along the longitudinal edge thereof at regular intervals, each hole having an injection-molded fastener element E secured thereto, a perforated section L' also having the holes H punched along the longitudinal edge thereof at regular intervals, the holes in this section not yet having injection-molded fastener elements secured thereto, and a solid section S devoid of the holes H. This section serves as the "ear" portion (a portion devoid of fastener elements) formed at the beginning and end of the fastener element rows on a stringer tape, and it is this section which is cut, following the injection-molding and securing of the fastener elements, in order to provide slide fasteners of a fixed length. A reinforcing border W is provided along the longitudinal edge of the tape T onto which the fastener elements E are to be secured. The reinforcing border W ordinarily is formed by weaving a thread into the longitudinal edge of the tape T.

Figure 2:
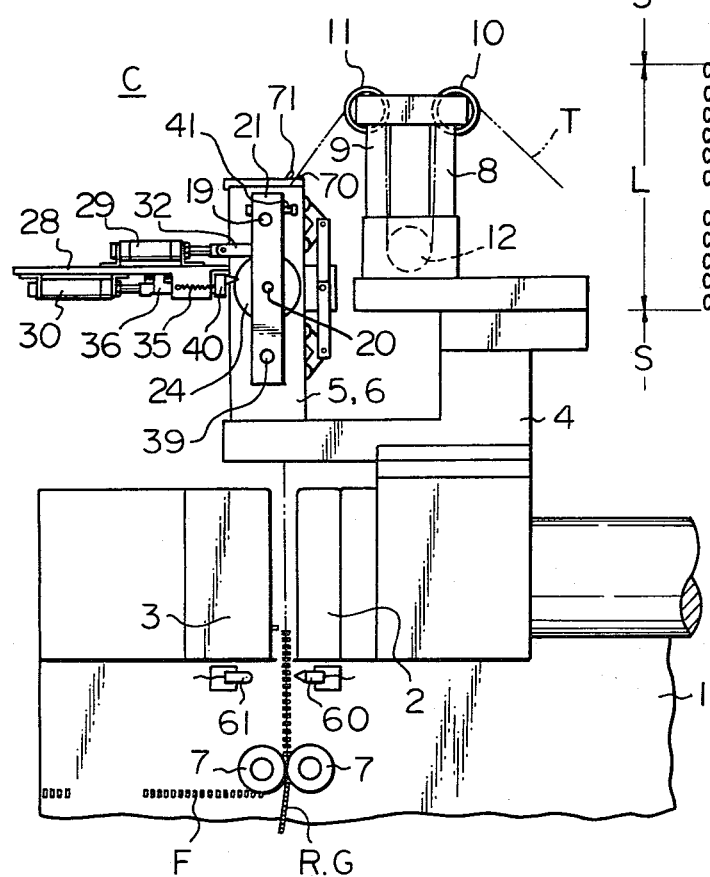
FIG. 2 is a side view of an apparatus embodying the present invention.
Figure 3:
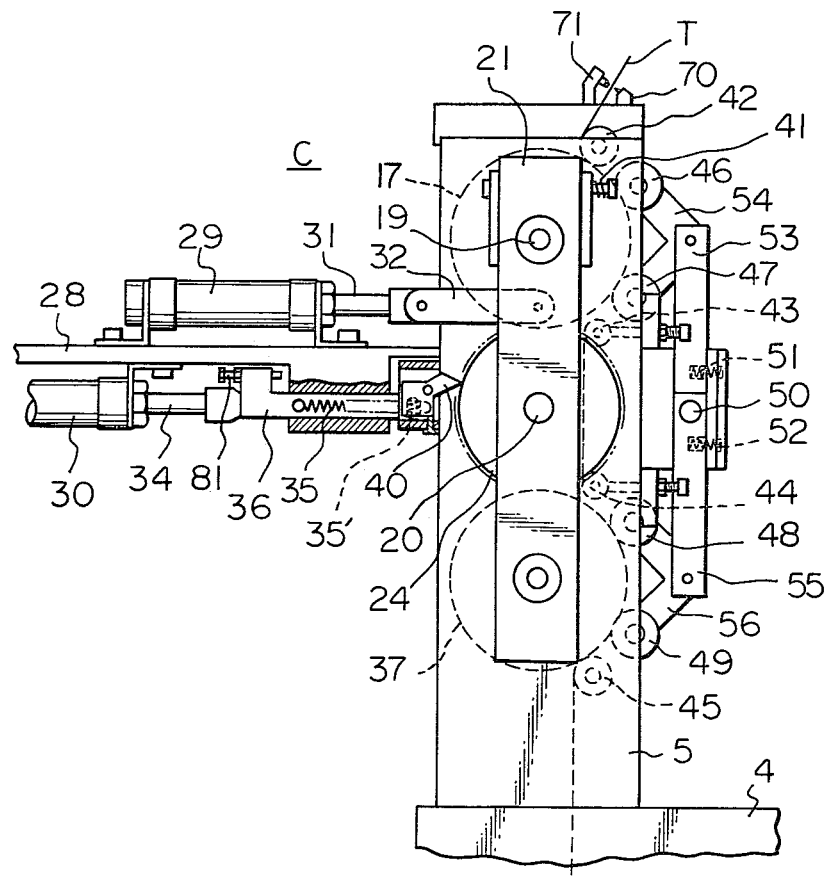
FIG. 3 is an enlarged side view of a tape feed adjustment section.
Figure 4:
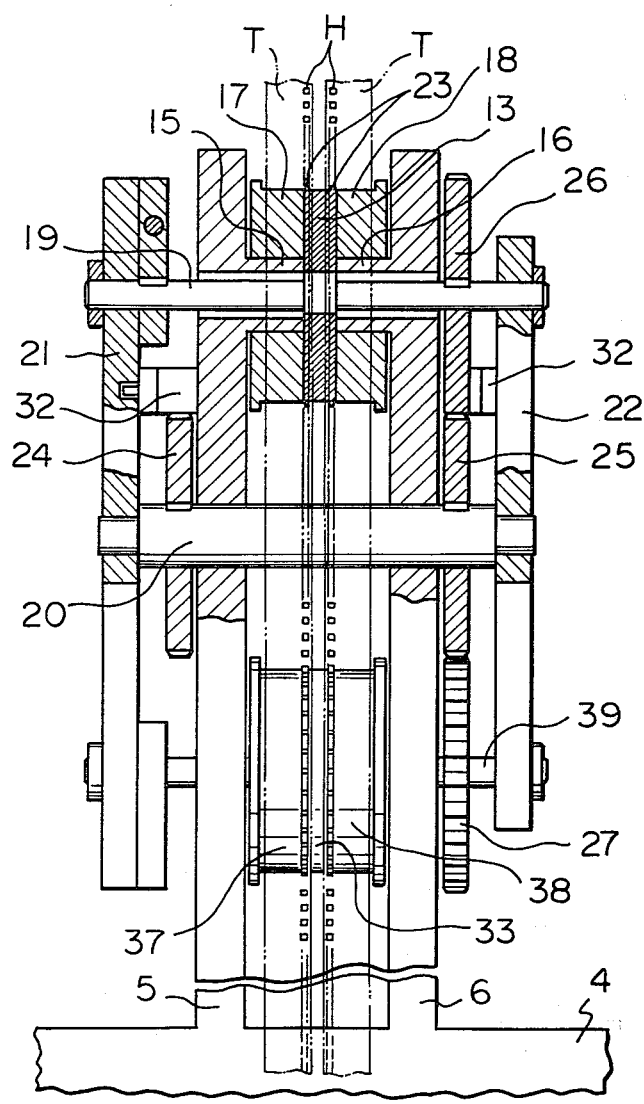
FIG. 4 is a front view in which principal portions of the arrangement of FIG. 3 are further enlarged and shown partially in section.

The apparatus, as shown in FIGS. 2 through 4, includes a base 1, a movable mold 2 supported on the base 1 and operated by hydraulic pressure or the like, and a stationary mold 3 supported on the base 1 and facing the movable mold 2. A frame 4 also is provided on the base 1. Mounted on the frame 4 is a tape guide mechanism comprising supporting columns 8, 9, delivery guide rolls 10, 11 supported at the upper ends of the respective supporting columns 8, 9, and a tension roll 12 disposed intermediate the delivery guide rolls 10, 11 and movable vertically. A pair of tapes T each have, along one longitudinal edge thereof, the perforated sections L' of holes H separated by prescribed regular intervals, alternating with the predetermined solid sections S. The tape guide mechanism guides the tapes withdrawn with constant tension by feed rolls 7 from a take-up spool, which is not shown, as the tapes are held in parallel while their perforated edges are faced toward each other with a prescribed spacing between them. Also mounted on the frame 4 is a tape feed adjustment section C provided downstream of the tape guide mechanism. A convenient arrangement is to mount the frame 4 on the base 1 so as to be movable vertically. This enables the distance from the tape feed section C to the molds 2, 3 to be altered to allow a change in the tape feed conditions.

The apparatus further includes a pair of the reversibly driven feed rolls 7 disposed downstream of the molds 2, 3 for feeding the fastener chains F having the injection-molded fastener elements secured thereto. A sensor comprising a light source 60 and photoelectric tube 61 is provided immediately downstream of the molds for sensing the trailing end of an injection-molded fastener element section of the tape.

The tape feed adjustment section C, shown in greater detail in FIGS. 3 and 4, is equipped with spaced-apart supporting plates 5, 6 erected on the frame 4 so as to lie in parallel with each other. Projecting horizontally inwardly from the upper portions of the supporting plates 5, 6 are hollow shafts 15, 16, respectively, each supporting respective upper drums 17, 18 that are free to rotate. Passing through the hollow shafts 15, 16 and extending to the outside of the supporting plates 5, 6 is a support shaft 19 of a diameter smaller than the inner diameter of the hollow shafts 15, 16. Oscillating plates 21, 22 are loosely fitted on a central shaft 20 axially secured to the central portions of the supporting plates 5, 6 and spanning across and through the supporting plates. The support shaft 19 is axially supported at each of the upper portions of the oscillating plates 21, 22. Fixedly secured to the support shaft 19 is a sprocket wheel 13 having two parallel circumferentially extending rows of plural teeth 23 projecting from the circumferential surface thereof. The sprocket wheel 13 is situated between the freely rotatable drums 17, 18 supported on the hollow shafts 15, 16. Moving the support shaft 19 from side to side via the oscillating plates 21, 22 causes the sprocket wheel 13 to assume, selectively, one eccentric position offset to one side of the central axis of drums 17, 18, and another eccentric position offset to the other side of the central axis. The supporting plates 5, 6 are similarly provided at their lower portions with a sprocket wheel 33 and freely rotatable lower drums 37, 38 arranged in the same manner as the corresponding parts at the upper portions of the supporting plates. A support shaft on which the sprocket wheel 33 is fixedly secured has each end thereof axially supported at the lower portion of the oscillating plates 21, 22.

A ratchet wheel 24 and an intermediate gear 25 are fixedly secured to the central shaft 20. The intermediate gear 25 is meshed with a gear 26 secured to the upper support shaft 19, and with a gear 27 secured to the lower shaft 39, so that the shafts 19, 20 and 39 rotate in an interlocking manner.

Numeral 28 denotes a mounting plate fixed to the supporting plates 5, 6. Fixedly mounted to the mounting plate 28 are a first air cylinder 29 and second air cylinder 30. The first air cylinder 29 has a piston rod 31 which is coupled to the upper portions of the oscillating plates 21, 22 by a forked connecting rod 32. The second air cylinder 30 has a piston rod 34 which is in contact with a push rod 36 biased away from the ratchet wheel 24 by means of a spring 35. The push rod 36 is so supported as to be slidable with respect to the mounting plate 28. The end of the push rod 36 facing the ratched wheel 24 is equipped with a beak-shaped pawl 40 urged in the clockwise direction (FIG. 3) by a spring 35' and pivotable about its support shaft. The tip of the pawl 40 is capable of engaging the teeth on the outer periphery of the ratchet wheel 24.

A spring 41 constantly urges the oscillating plates 21, 22 in a given direction. A light source 70 photoelectric tube 71 are provided to sense a solid section S on the tapes T. Numerals 42, 45 and 43, 44 designate a pair of fixed and a pair of adjustable guide rolls, respectively, that cooperate with the upper rotatable drums 15, 16 and lower rotatable drums 37, 38 in guiding the tapes T. Support rods 53, 55 are urged by springs 51, 52 on a support shaft 50 fixedly secured to the supporting plates 5, 6. One end of each support rod 53, 55 axially supports a forked rod 54, 56, respectively, for rocking motion. The ends of the forked rods 54, 56 axially support pinch rolls 46, 47, 48, 49 for rotation, the latter serving to press and retain the tapes T against the surfaces of the freely rotatable drums 15, 16, 37, 38.

The novel apparatus of the foregoing construction, by executing the steps described hereinbelow, repeatedly forms synthetic resin fastener elements E on a tape by injection molding, thereby to continuously manufacture the slide fastener chains F having the solid sections S mentioned above.

Figure 10:
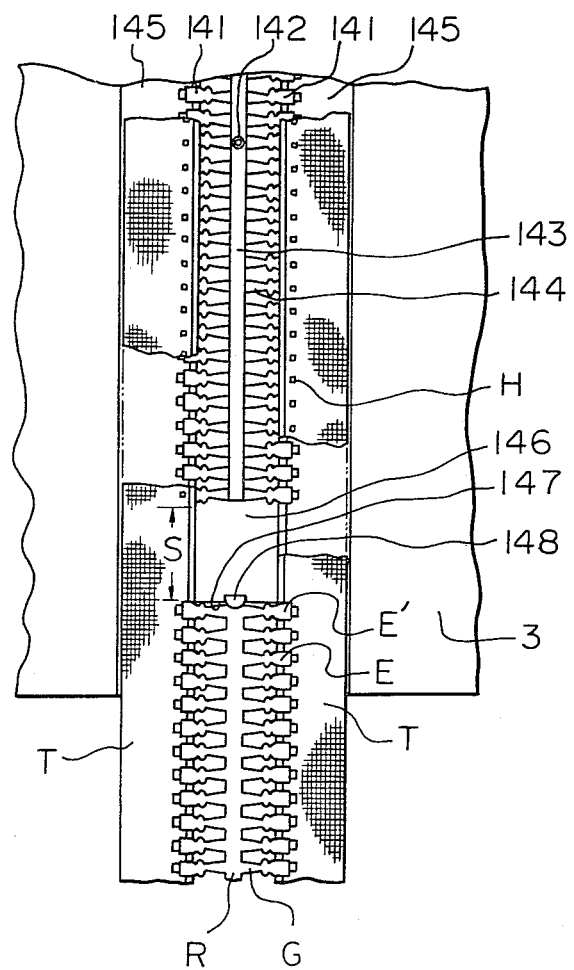
FIG. 10 is a fragmentary front view of a stationary mold with a pair of slide fastener stringers, showing the manner in which a pair of rows of injection-molded fastener elements are formed on a pair of stringer tapes along their respective inner longitudinal edges.
Figure 11:
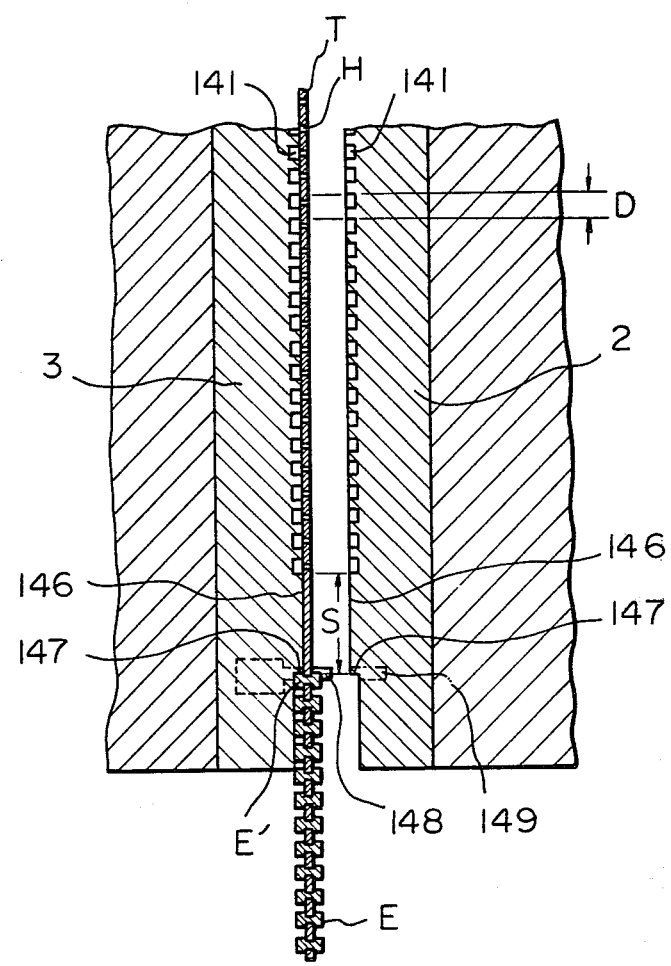
FIG. 11 is a sectional side view showing the relationship between the stationary mold and a movable mold.

The molds for injection molding the fastener elements E have the structure depicted in FIGS. 10 and 11. The movable mold 2 and stationary mold 3 have opposing molding faces which are formed to include a multiplicity of fastener element cavities 141 at prescribed intervals D along a prescribed length L. The cavities 141 are interconnected through a runner 143 and gates 144. The opposing mold faces are further provided with a tape guide channel 145. The stationary mold 3 is provided with a nozzle 142 for injecting molten synthetic resin. Provided downstream of the cavities 141 of each mold are a flat surface portion 146 for forming the solid section S on the tape T, and a step portion 147 at the downstream end of the flat surface portion 146 for engaging the last fastener element E' at the trailing end of previously molded fastener elements, as will be described below. A feeler 148 is provided on the stationary mold 3 projecting from the mold surface to engage and stop the trailing end of the previously molded runner R, as will be described below. A receiving hole 149 is provided in the molding surface of the movable mold 2 to receive the end of the feeler 148.

Two tapes T are each provided beforehand, over a predetermined length thereof, with the holes H along the longitudinal edge thereof at regular intervals d slightly smaller than the pitch D of the molding cavities 141, and with solid sections S where no holes H exist. The two tapes T are passed through the molds while being maintained with a predetermined distance between them. When the light source 60 and photoelectric tube 61 sense the last fastener element E' at the trailing end of the previously molded fastener chain, the feeding of the tapes T by the feed rolls 7 is stopped. The movable mold 2 is then moved toward the stationary mold 3 to a half-closed position, at which time the feed rolls 7 are reversely driven to reversely feed the tapes T until the trailing end of the previously molded runner R on the fastener chain abuts against the feeler 148 and the previously molded trailing fastener element E' abuts against the step portion 147. Now the second air cylinder 30 is actuated by air pressure to rotate the ratchet wheel 24 through a prescribed angle via the pawl 40. The intermediate gear 25, turning in unison with the ratchet wheel 24 via the central shaft 20, rotates the upper and lower sprocket wheels 13, 33 of the tape feed adjustment mechanism C in the reverse direction through the gears 26, 27. This applies tension to the tapes T, with the last fastener element E' at the trailing end of the previously molded elements being retained firmly in abutting contact with the step portion 47.

Figure 12:
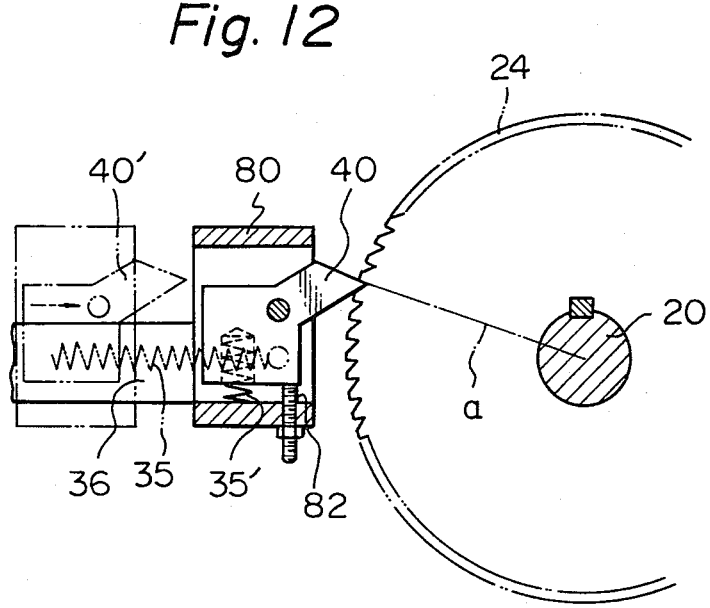
FIGS. 12 and 13 are side views showing operational relationship between a ratchet wheel and pawl.
Figure 13:
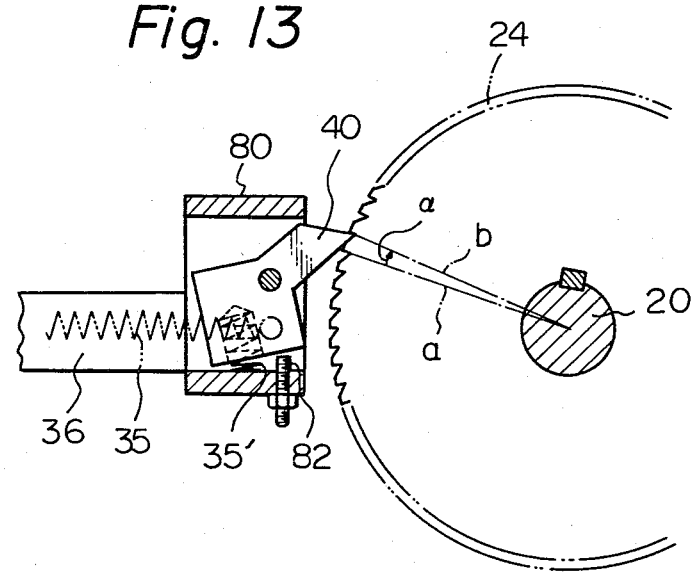

The action of the ratchet wheel 24 may be understood more clearly from FIGS. 12 and 13. In FIG. 12, the beak-shaped pawl shown by the phantom lines at numeral 40' indicates the position of the pawl 40, pivotally mounted within a case 80 provided at the end of the push rod 36, prior to the actuation of the second air cylinder 30, that is, at such time that the push rod 36 has been pulled back and restored to its leftward position by the spring 35. When pressurized air acts upon the second air cylinder 30, the latter is actuated and advances the push rod 36 rightwardly against the force exerted by the tensioned spring 35, so that the pawl 40 is brought into engagement with a tooth on the ratchet wheel 24. The position of the pawl 40 at this instant is indicated by the solid lines in FIG. 12. As the push rod 36 is advanced further to the right by the second air cylinder 30, the pawl 40 is pivoted counter-clockwise against the force of the spring 35', whereby the ratchet wheel 24 is rotated by an angle α, or from a to b as indicated by the one-dot chain lines in FIG. 13. The angle of rotation α can be adjusted by adjusting the stroke of the push rod 36 via a stopper 81 (FIG. 3) and the pivoting angle of the pawl 40 via a stopper 82. The angular motion of the ratchet wheel 24 through angle of rotation α is transmitted to the upper and lower sprocket wheels 13, 33 via the gear train which includes the intermediate gear 25 fixed to the shaft 20, so that the sprocket wheels 13, 33 are rotated in the reverse direction. As a result of this reverse rotation of the sprocket wheels, the tapes T are stretched in such a manner that the pitch d of the holes punched in the tapes is brought into agreement with the pitch D of the cavities in the molds, i.e., so that the holes H are aligned with the cavities 141. When this is accomplished, the movable mold 2 is moved to the fully closed position. Molten synthetic resin material is then injected into the cavities to mold the fastener elements E onto the tapes T at the holes H, after which the movable mold 2 is moved away from the stationary mold, and ejector pins (not shown) are employed to eject the fastener elements E molded on the tapes T. The multiplicity of fastener elements E molded on the two tapes T are interconnected through the runner R and gates G until the elements are ejected. Simultaneously with the ejection step the feed rolls 7 are driven in the tape feeding direction and the runner R and gates G are cut off as the stringer tapes pass between the feed rolls 7. Thus, two completed fastener chains F are obtained and conveyed to a take-up means (not shown).

Figure 5:
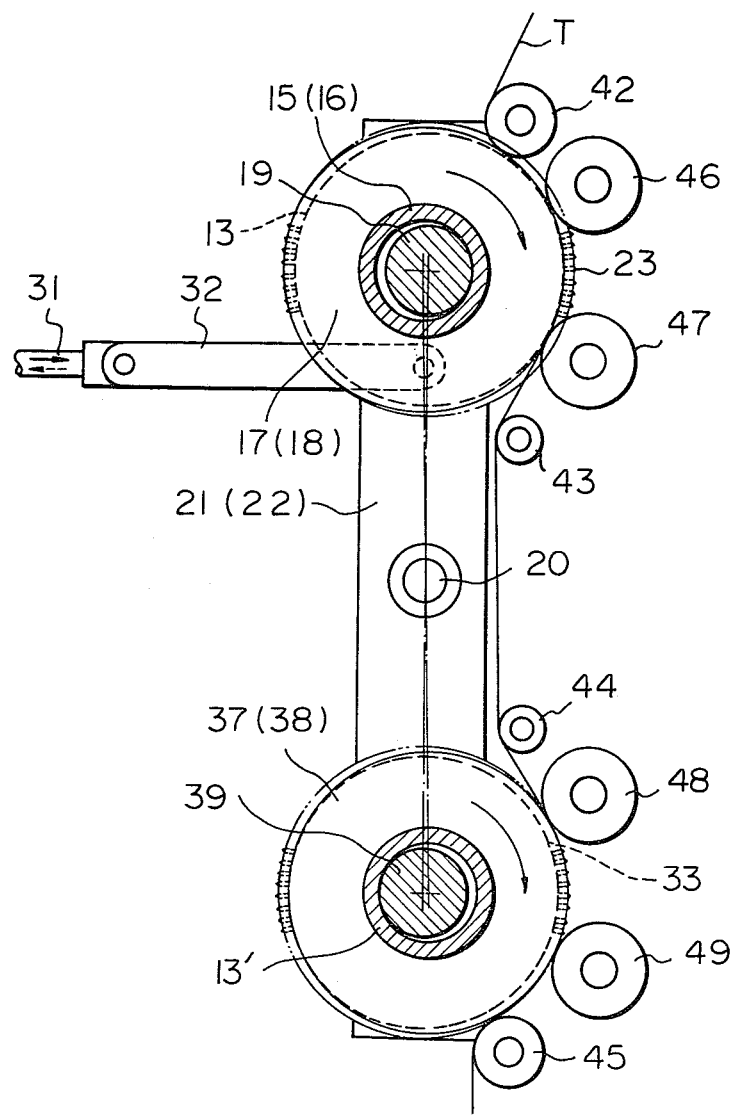
FIGS. 5 to 9 are illustrative views useful in describing the operation of the invention.

As the completed fastener chains are being conveyed to the take-up means, a tape supply spool (not shown) is braked against movement, so that the tension roll 12 is gradually raised from its lowered position, permitting the portions of the tape reserved by the tension roll 12 to be transferred into the tape feed adjustment section C through the guide roll 42. Under these conditions the rotary shaft 19 of the upper sprocket wheel 13 is being urged to the left in FIG. 3 by the spring 41, acting through the oscillating plates 21, 22, so that the teeth 23 are retracted inwardly of the circumferential tape-contact surfaces of the upper freely rotatable drums 17, 18 while, on the other hand, the rotary shaft 39 of the lower sprocket wheel 33 is being moved to the right in FIG. 3 so that the teeth 23 on the sprocket wheel 33 project outwardly from the tape-contact surfaces of the lower freely rotatable drums 37, 38. Under these conditions, therefore, the tapes T are fed by the teeth 23 on the lower sprocket wheel 33 meshing with the holes H in the tapes T. When the photoelectric sensor comprising the light source 70 and photoelectric tube 71 senses a solid section S on the tapes, the first air cylinder 29 is actuated, by means of a timer (not shown) a predetermined time after the solid section S is sensed. As the timer is counting down the time, i.e., before the first air cylinder 29 is actuated, the solid section S is being passed over the upper drums 17, 18 and reaches a point just short of the lower drums 37, 38. At this instant the piston rod 31 is pushed forward by the first air cylinder 29 as commanded by the timer, causing the oscillating plates 21, 22 to tilt to that the teeth 23 on the lower sprocket wheel 33 are retracted inwardly of the tape-contact surfaces of the lower drums 37, 38, as shown in FIG. 5. At the same time, the teeth 23 on the upper sprocket wheel 13, which is moved in the direction opposite to that of the lower sprocket wheel 33 owing to the action of the oscillating plates 21, 22, are projected beyond the tape-contact surfaces of the upper drums 17, 18 to mesh with the holes in the tapes T, the upper sprocket wheel 13 turning as the tapes T are fed. Since the upper sprocket wheel 13 and lower sprocket wheel 33 are coupled to each other by the gears 26, 27 through the intermediate gear 25, they will always rotate at the same speed, so that a correct positional relationship for proper meshing of the teeth 23 and holes H is maintained at all times.

In accordance with the apparatus of the present invention as described above, a tape T, even if it includes the solid sections S, will not be deformed, strained or damaged as a result of the solid section being pressed against by the teeth 23. The tape can therefore be fed smoothly to the fastener element injection molding position.

When the solid sections S have passed over the lower drums 37, 38, the first air cylinder 29 is actuated to retract the piston rod 31, and the force exerted by the spring 41 pushes the oscillating plates 21, 22 back to their original positions. As a result, the teeth 23 on the lower pilot wheel again project beyond the tape-contact surfaces of the lower drums 37, 38 and are restored to meshing engagement with the holes H in the tapes T.

Figure 6:
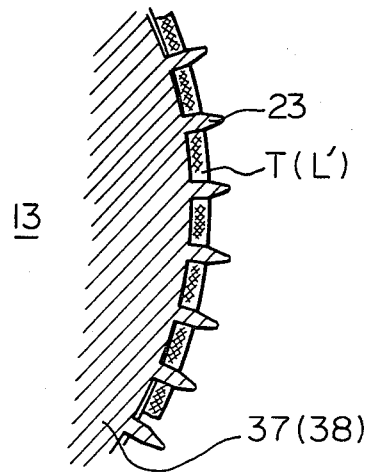
Figure 7:
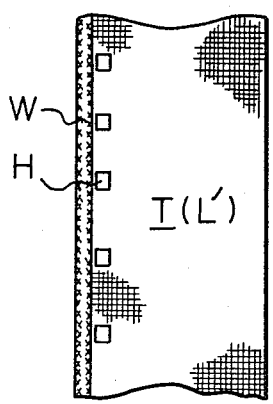
Figure 8:
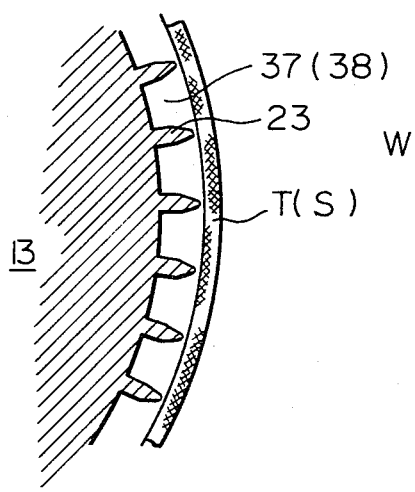
Figure 9:
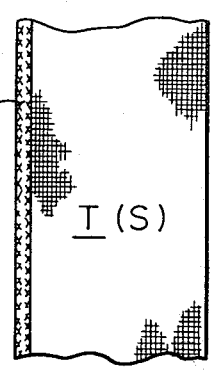

As the tapes T are conveyed they are pressed against portions of the circumferential surfaces of both the upper drums 17, 18 and lower drums 37, 38, without slackening, by means of the guide rolls 42, 43, 44, 45 and pinch rolls 46, 47, 48, 49. This condition is shown more clearly in FIGS. 6 through 9. As the perforated section L' of a tape T, depicted in FIG. 7, contacts the drum 37 (38), the teeth 23 on the sprocket wheel 33 penetrate the holes H in the perforated section and are advanced thereby, as shown in FIG. 6. When the solid section S of the tape, shown in FIG. 9, contacts the drum 37 (38), the rotary shaft of the sprocket wheel 33 is pushed to the left in FIG. 3 by the spring 41, so that tips of the teeth 23 are shifted to a retracted position inwardly of the tape-contact surface of the drum 37 (38), as shown in FIG. 8.

As described above the upper and lower sprocket wheels 13, 33 alternately expose their teeth 23 to the tapes T from the circumferential surfaces of the upper drums 17, 18 and lower drums 37, 38 owing to the action of the oscillating plates 21, 22, and they are rotated in an interlocking manner owing to the intermediate gear 25. Therefore, if the diameters of the upper and lower drums 17, 18, 37, 38 and of the sprocket wheels 13, 33, as well as the distance between their axes, are determined beforehand to suit the total length of a perforated section L' and solid section S of the tapes, then, in accordance with the fastener element injection molding step, the movable mold can be moved to the half-closed position and the tapes stretched by the predetermined amount by the action of the second air cylinder 30 and pawl 40 with the perforated sections L' of the tapes being held in constant contact with the circumferential surfaces of the lower drums 37, 38 and retained securely on the lower drums owing to the meshing engagement between the teeth 23 and holes H.

In the foregoing preferred embodiment the meshing engagement between the upper and lower sprocket wheels 13, 33 and the tapes T is always effected alternately by means of the oscillating plates 21, 22. It should be noted, however, that separate air cylinders, actuated at a suitable timing, may be provided for moving the respective shafts of the sprocket wheels 13, 33 to conform to changes in the tape conditions. Such an arrangement would permit both the upper and lower sprocket wheels to mesh with the holes in the tapes as the tapes are fed, during such intervals that the solid sections are not situated at the drums. This would stabilize the feeding of the tapes.

No particular problems arise in cases where the length of solid section S or the length of perforated sections L' is changed. To accommodate for such changes it suffices to vertically adjust the frame 4 and to change molds and, in addition, to regulate the amount by which the tapes are stretched, this being accomplished by changing the extent to which the push rod 36 is projected by the second air cylinder 30.

In the embodiment described a pair of tapes are processed simultaneously. However, as will be clear from the attached claims, such an arrangement does not constitute an essential requirement of the invention.

With the present invention a tape feed adjustment necessary for injection molding synthetic resin fastener elements on a tape having solid sections can be performed without adversely affecting the tapes as they are reliably conveyed, retained and stretched. This provides slide fasteners of uniform quality with strongly and securely attached fastener elements.

As many widely different embodiments of this invention may be made without departing from the spirit and scope thereof, it is to be understood that the invention is not limited to the specific embodiment thereof except as defined in the appended claims.

What is claimed is:

1. An apparatus for manufacturing a fastener chain having solid sections and of the type wherein the fastener chain is manufactured by providing a tape including perforated sections having holes formed along a longitudinal edge of the tape at regular intervals, said intervals being smaller than the spacing intervals of fastener element molding cavities in a fastener element injection molding machine, and solid sections in which no holes are formed, said perforated sections and solid sections alternating along the length of the tape, supplying the tape so that a perforated section thereof is placed between a stationary mold and movable mold of the injection molding machine, tensioning the tape to stretch the same, so that the spacing intervals of the holes in said perforated section of the tape are brought into agreement with the spacing intervals of the fastener element molding cavities in the molds, and then injection molding fastener elements onto said perforated section of the tape at the holes, said apparatus comprising:

an injection molding machine having a stationary mold and a movable mold movable relative thereto, said stationary and said movable molds each having molding cavities at spaced intervals therein;

means adjacent said molds to inject moldable material into said mold cavities;

a pair of spaced hollow shafts adjacent to said molds;

a pair of freely rotatable drums, each supported for rotation on a respective one of the hollow shafts;

a pair of support shafts passed through respective ones of said hollow shafts in such a manner that said support shafts may be driven rotatively and oscillated in the radial direction thereof;

a pair of sprocket wheels each having a row of peripheral teeth and fixedly secured on respective ones of said support shafts and disposed adjacent the side of said freely rotatable drums;

guide rollers cooperating with said pair of freely rotatable drums for guiding the tape into the space between said molds;

support shaft drive means for oscillating the support shafts of said sprocket wheels within said hollow shafts when a perforated section of the tape contacts and passes over the circumferential surface of a freely rotatable drum, in such a direction that causes the teeth on one of the sprocket wheels to project beyond the circumferential surface of said freely rotatable drum, and for oscillating the support shafts of said sprocket wheels within said hollow shafts, when a solid section of the tape contacts and passes over the circumferential surface of said freely rotatable drum, in such a direction that causes the teeth on said sprocket wheel to recede below the circumferential surface of said freely rotatable drum; and tensioning means operable, when a perforated section of the tape reaches a predetermined position between said molds and the movable mold is moved toward the stationary mold to a half-closed position with said perforated section of the tape interposed therebetween, to apply tension to the tape by rotating one of said sprocket wheels reversely through a predetermined angle, thereby to bring the spacing intervals of the holes in said perforated section into agreement with the spacing intervals of the fastener element molding cavities in said molds.

2. An apparatus according to claim 1, in which said support shaft drive means includes:

a pair of oscillating plates for rotatably supporting said pair of support shafts at both ends thereof, and having a central shaft fixedly secured to the central portions thereof;

reciprocating drive means for oscillating said pair of oscillating plates in accordance with the feeding of the tape so as to cause said teeth to project beyond the circumferential surface of said sprocket wheel while the perforated section of the tape is contacting said circumferential surface, and to recede below the circumferential surface of said sprocket wheel while the solid section of the tape is contacting said circumferential surface;

an intermediate gear fixedly secured on said central shaft; and a pair of gears, fixedly secured on respective ones of said pair of support shafts, for meshing with said intermediate gear.

3. An apparatus according to claim 2, in which said tensioning means includes:

a ratchet wheel fixedly secured on said central shaft;

a beak-shaped pawl capable of engaging said ratchet wheel; and pawl drive means for bringing said beak-shaped pawl into engagement with said ratchet wheel when said ratchet wheel is to be rotated reversely through a predetermined angle.

* * * * *